United States Patent [19]
Bergqvist et al.

[11] Patent Number: 5,089,738
[45] Date of Patent: Feb. 18, 1992

[54] BATTERY-DRIVEN HANDTOOL

[75] Inventors: Håkan Bergqvist; Hans Himbert, both of Bromma; Conny Jansson, Enköping, all of Sweden

[73] Assignee: AB Bahco Verktyg, Sweden

[21] Appl. No.: 634,617

[22] Filed: Dec. 27, 1990

[30] Foreign Application Priority Data

Jan. 10, 1990 [SE] Sweden .................. 9000080

[51] Int. Cl.$^5$ .................................. H02J 7/00
[52] U.S. Cl. ............................ 310/50; 310/47; 320/2
[58] Field of Search ............... 310/50, 47; 320/2; 429/99, 100; D8/59; D13/103; D15/139

[56] References Cited
U.S. PATENT DOCUMENTS

| | | | |
|---|---|---|---|
| 3,734,207 | 5/1973 | Fishbein | 310/50 |
| 3,999,110 | 12/1976 | Ramstrom et al. | 320/2 |
| 4,728,876 | 3/1988 | Mongeon et al. | 320/2 |
| 4,804,821 | 2/1989 | Glucksman | 219/271 |
| 4,835,410 | 5/1989 | Bhagwat et al. | 310/50 |

Primary Examiner—Steven L. Stephan
Assistant Examiner—Matthew Nguyen
Attorney, Agent, or Firm—Klarquist, Sparkman, Campbell, Leigh & Whinston

[57] ABSTRACT

A battery-driven handtool is configured with a holder (4) for housing the current source, this housing being detachably connected to the handgrip (1) of the tool. The holder is journalled for asymmetric rotation (around A) on the free end of the handgrip, so as to enable the outer dimensions of the tool to be minimized, by causing the holder to take at least two mutually opposing positions when the working space is confined, thereby also enabling the center of gravity point (TP) of the tool to be changed.

8 Claims, 2 Drawing Sheets

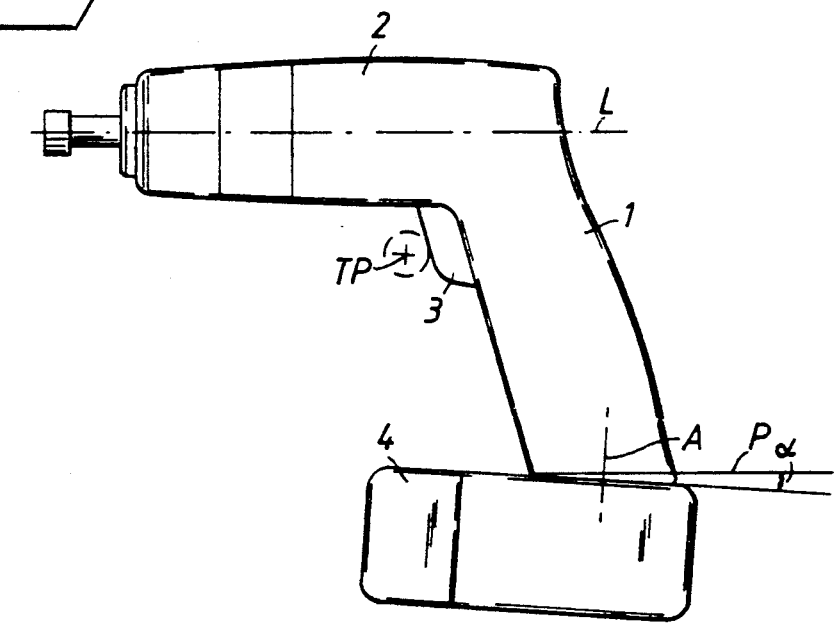
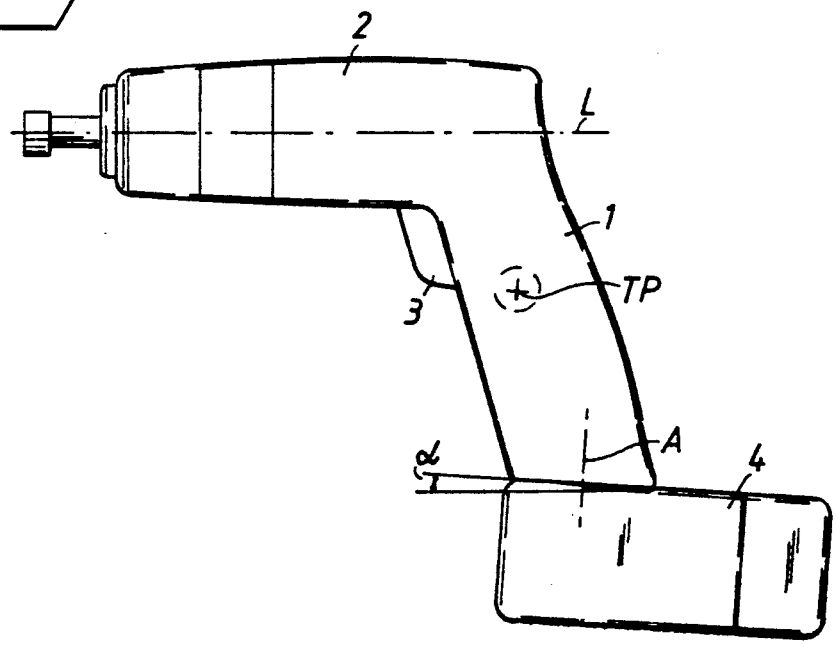

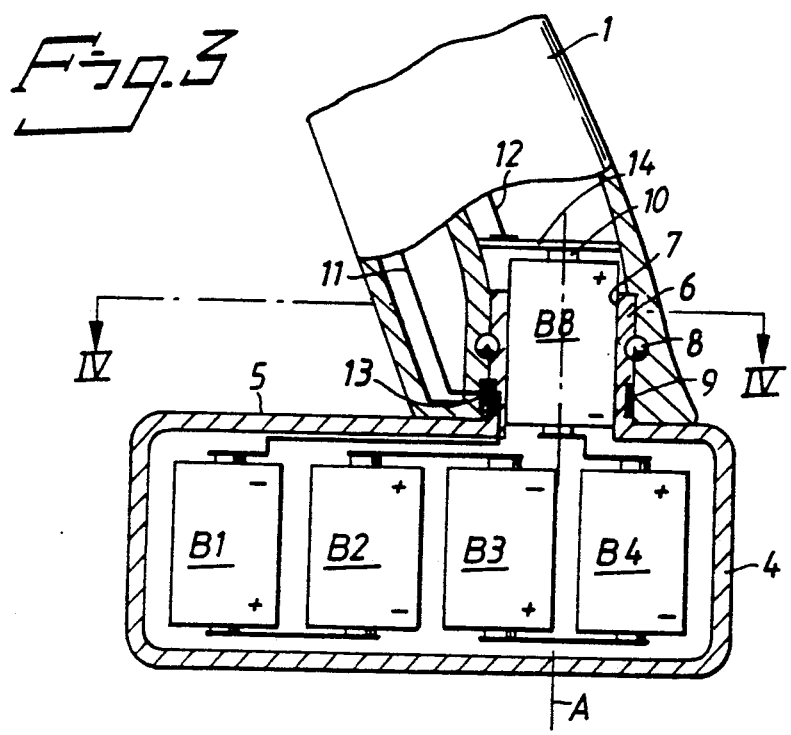
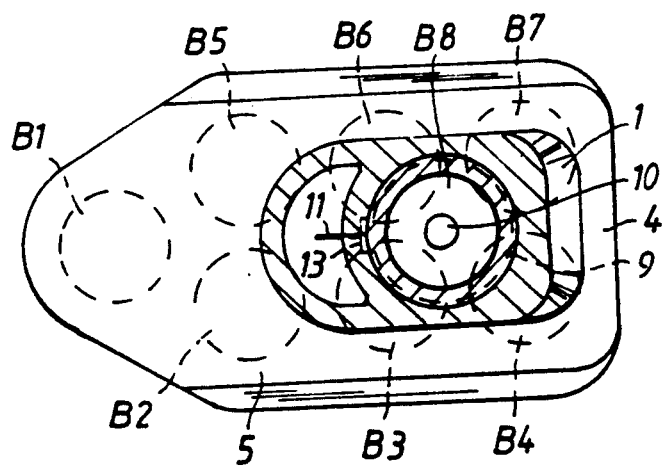

BATTERY-DRIVEN HANDTOOL

TECHNICAL FIELD

The present invention relates to a battery-driven handtool having a handgrip which carries at its one end a motor casing and which includes an electrical switch connected to a supply line which extends between the motor housed in said casing and a power source by means of which motor is driven.

BACKGROUND ART

Battery-driven handtools, such as drilling machines or screw tightener, generally designated "cordless machines" are available commercially in a large number of varities. All of these machines, however, have one feature in common, namely that located somewhere on the machine is a current source in the form of a battery pack.

This battery pack is relatively heavy and has a relatively large volume. Known cordless machines suffer in various ways due to the presence of the battery pack, since the pack is either dimensioned or positioned so as to be accommodated predominantly within the handgrip. Consequently, the handgrip casing surrounding the battery pack becomes too large for a hand of average size. Another known variant is one in which a much smaller part of the battery pack is enclosed within the handgrip part, while the major part of the battery pack "hangs" beneath the handgrip. Although this enables the handgrip to be dimensioned as desired, the arrangement increases the total outer dimensions of the machine. This means, in turn, that the centre-of-gravity of the machine will be unsuitably positioned, among other things, and that it is at times difficult to use the machine in confined working spaces.

DISCLOSURE OF THE INVENTION

The aforesaid drawbacks are avoided completely or partially with the inventive battery-driven handtool, the current source of which is carried substantially in a holder located on the free end of the handgrip. The holder is asymmetrically mounted with respect to an axis passing through the free end of said handgrip, and can be adjusted to at least two mutually opposing positions.

Adjustment of the holder between these two, mutually opposite directions is effected advantageously by rotating or twisting the holder around said axis, said holder thus being rotatably mounted on the free end of the handgrip.

The advantages afforded with this arrangement are that when the working space is very confined, the outer dimensions of the machine can be minimized by choosing the smallest space-requiring battery position, and that when the working space so permits, a free choice can be made between the two alternative holder positions and therewith also the prevailing position of the centre of gravity of the machine.

DESCRIPTION OF PREFERRED EMBODIMENTS

The inventive battery-driven handtool will now be described in more detail with reference to exemplifying embodiments thereof illustrated in the accompanying drawings, in which FIG. 1 illustrates a battery-driven handtool in the form of a pistol-like drilling machine, and shows the holder which houses the tool current source in a forwardly extended position;

FIG. 2 illustrates the same handtool as that shown in FIG. 1 but with the holder for the tool current source rotated through 180°, i.e. extending rearwardly;

FIG. 3 is a vertical section through a lower part of the handgrip and the current source holder, and illustrates a preferred form of the rotatable mounting which joins the holder to the handgrip; and FIG. 4 is a section taken through the line IV—IV in FIG. 3 and indicates the position of the batteries in the holder, these batteries forming said electric current source.

FIGS. 1 and 2 illustrate a battery-driven handtool constructed in accordance with the present invention. The illustrated tool is a pistol-like drilling machine comprising a handgrip 1 which carries a motor casing 2 at one end thereof. This end of the handgrip also carries a switch 3.

Mounted on the lower, free end of the handgrip 1 is a holder 4 which is intended to house the electric current source required for driving the motor journalled in the motor casing 2. In accordance with the present invention, the holder 4 is journalled for asymmetric rotation around a pivot axis A. Thus, the holder 4 can be rotated or turned between a forwardly extending or protruding position, shown in FIG. 1, and a rearwardly extending or projecting position shown in FIG. 2.

By rotating the holder 4, it is possible to alter the shape of the tool, so as to enable the tool to be used when working in confined spaces, without changing the gripping surface of the handgrip 1, for instance. When the holder is located in its forwardly extending position, shown in FIG. 1, the outer dimensions of the tool are at a minimum and the centre-of-gravity TP of the tool lies forwardly of the switch 3. When the holder 4 is in its forwardly extending position, said holder can also be used as a foot or stand on which the tool can be supported when not in use.

When the holder is adjusted to its rearwardly extending position, shown in FIG. 2, the centre of gravity TP is moved into the tool handgrip 1. Thus, the person using the tool is able to shift the centre of gravity point TP as desired. The lower surface of the handgrip 1, against which the holder 4 abuts, will suitably form an angle $\alpha$ with a plane P extending parallel with the longitudinal axis L of the motor casing 2. As a result, there is obtained a free space for accommodating the wrist of the user, despite the fact that the holder 4 extends rearwardly. This angularly positioned surface also affords the advantage of further minimizing the tool dimensions when the holder 4 is switched to its forwardly extending position shown in FIG. 1.

FIG. 3 is a vertical section of the coupling or mounting between the lower part of the handgrip 1 and the holder 4. This Figure illustrates a preferred embodiment of the rotational coupling of the holder 4 to the free end of the handgrip 1.

According to the preferred embodiment of the holder 4 of the inventive tool, the holder is configured as a housing for accommodating a plurality of electric batteries B1–B8 which form said current source. That side 5 of the housing which faces towards the free end of the handgrip 1 has an opening provided with a flange 6. The flange 6 is intended to be received in a recess 7 in the free end of the handgrip 1. Both the opening in the housing side 5 and the recess 7 have a circular cross-section, and the flange 6 is pivotally mounted in the recess 7, as indicated by the balls 8, which are spring biased so as to snap into a peripheral groove around the surface of the flange 6.

The holder 4 is thus detachably mounted in the recess 7 of the handgrip 1, so as to enable the batteries B1-B8 to be recharged without needing to remove the batteries from the holder 4. When recharging the batteries B1-B8, there is used an electric contact plate 9 provided on the flange 6 and the one therewith exposed pole 10 of the upstanding battery B8. As will be seen from FIG. 3, the same electrical connections 9 and 10 are used for connecting the conductors 11 and 12 extending from the motor of the drilling machine. The conductor 11 is therewith connected to a first contact spring 13 which lies against the contact plate 9. The conductor 12 is connected to a second contact spring 14, which lies against the pole 10 of the battery B8 when the holder 4 is mounted in the recess 7.

The aforedescribed electrical contact arrangement 13, 9 and 14, 10 respectively enables the holder 4 to be rotated through 360° relative to the handgrip 1.

Naturally, the electrical contact arrangement can be simplified by permitting the holder and the handgrip to rotate through only 180°, and to provide stop means which will prevent rotation of the holder 4 beyond the forwardly extending and rearwardly extending limit positions.

In the case of a modified embodiment of the inventive tool, the holder 4 is not rotatably mounted on the handgrip 1, but is instead capable of being fitted in two distinct, alternative positions. In this case, the holder 4 is either fitted in a forwardly extending position, as shown in FIG. 1, or, alternatively, in a rearwardly extending position shown in FIG. 2. This avoids the provision of complicated movable journal means in the handgrip and on the flange 6 fitted therein.

FIG. 4 is a top view of the preferred embodiment of the holder 4, and is a sectional view taken on the line IV—IV in FIG. 3. The Figure also indicates the positioning of the batteries B1-B8.

Although the battery-driven handtool has been described in the aforegoing with reference to the drawings and with reference to a particular configuration of a drilling machine, it will be understood by one skilled in this art that the fundamental principle construction, as defined in the following Claims, can be modified in many ways without departing from the inventive concept. For instance, the positioning of the batteries may be different to that illustrated and the batteries need not, of course, be connected in series as illustrated in FIG. 3. Neither is the number of batteries used of decisive significance, and neither is the fact that the batteries are shown upstanding in the holder. The batteries may equally as well be held in horizontal positions, in two or more layers in the holder, which can also have a different layout to that illustrated.

Thus, the battery-driven tool shall not be considered to be limited to the described and illustrated embodiments, since other, different conceivable solutions are possible within the scope of the following Claims.

We claim:
1. A battery-driven tool comprising:
a handgrip having a first end and an asymmetrically free end;
a motor housed in a motor casing carried at the first end of the handgrip, the motor casing having a longitudinal axis, and the motor receiving electric current through a supply line;
an electric switch connected in the supply line and carried by the handgrip; and
an electric current source supplying electric current through the supply line and electric switch for driving the motor, characterized in that the electric current source is carried substantially at the asymmetrically free end of the handgrip by a holder, the holder being pivotally journalled for rotation around a journalling axis extending through the free end of the handgrip for adjustment so that said holder can be switched between at least two, mutually opposite positions, the holder being configured as a housing having a flanged opening, a rear half and a substantially rectangular cross-section, the housing accommodating the electric current source in the form of plural electric batteries with at least one battery extending into the handgrip through the flanged opening, and wherein the journalling axis extends from the free end of the handgrip and passes through the rear half of the housing.

2. A handtool comprising:
a handgrip having a first end and an asymmetrically free end with a recess therein;
a motor housed in a motor casing carried at the first end of the handgrip, the motor casing having a longitudinal axis, and the motor receiving electric current through a supply line;
an electric switch connected in the supply line and carried by the handgrip; and
an electric current source supplying electric current through the supply line and electric switch for driving the motor, characterized in that the electric current source is carried substantially at the asymmetrically free end of the handgrip by a holder, the holder being pivotally journalled for rotation around a journalling axis extending through the free end of the handgrip for adjustment so that said holder can be switched between at least two, mutually opposite positions, the holder being configured as a housing having a rear half, a substantially rectangular cross-section and a side facing towards the handgrip which has an opening provided with a flange configured to be accommodated in the recess in the free end of the handgrip, the flange of said opening being rotatably mounted in said recess, the housing accommodating the electric current source in the form of plural electric batteries, and wherein the journalling axis extends from the free end of the handgrip and passes through the rear half of the housing.

3. A handtool according to claim 1, characterized in that one conductor of the electric current supply line is connected to a first electric contact spring which lies against a conductor plate extending around the flange and connected to one pole of the current source, while the second electrical conductor of the current supply line is connected to a second contact spring which lies against the other pole of the current source, this other pole being centrally arranged on the axis passing through the free end of the handgrip.

4. A handtool according to claims 1 or 2, characterized in that the handgrip and the motor casing form, in a known manner, a pistol-like handtool, and in that the free end of the handgrip presents a surface which is angled to the longitudinal axis of the motor casing, such that the current-source holder presents a surface which forms an angle to the longitudinal axis of the motor casing.

5. A handtool according to claims 1 or 2, characterized in that when the holder extends or projects in the same direction as the motor casing, the handtool also having a centre-of-gravity which will lie forwardly of the handgrip between the holder and the motor casing.

6. A handtool comprising:
- a handgrip having a first end and an asymmetrically free end;
- a motor housed in a motor casing carried at the first end of the handgrip, the motor casing having a longitudinal axis, and the motor receiving electric current through a supply line;
- an electric switch connected in the supply line and carried by the handgrip; and
- an electric current source supplying electric current through the supply line and the electric switch for driving the motor, characterized in that the electric current source is carried substantially at the asymmetrically free end of the handgrip by a holder, the holder being pivotally journalled for rotation through 180° around a journalling axis extending through the free end of the handgrip for adjustment so that said holder can be switched between at least two, mutually opposite positions, the holder being configured at a housing having a flanged opening, a rear half and a substantially rectangular cross-section, the housing accommodating the electric current source in the form of plural electric batteries with at least one battery extending into the handgrip through the flanged opening, and wherein the journalling axis extends from the free end of the handgrip and passes through the rear half of the housing.

7. A handtool according to claims 1, 2 or 6, characterized in that the holder is detachably mounted on the handgrip, so that after removal, it can be connected to an external current supply source for recharging of the batteries forming the tool current source.

8. A handtool according to claim 7, characterized in that the electrical connection to the external current supply source is achieved through an electrical conductor plate on the flange and the central, second pole on the electric current source.

* * * * *